US 6,621,654 B2

(12) United States Patent
Coffin et al.

(10) Patent No.: US 6,621,654 B2
(45) Date of Patent: Sep. 16, 2003

(54) APPARATUS AND METHOD FOR RETAINING DIFFERENT SIZES OF DATA CARTRIDGES IN A STORAGE MAGAZINE

(75) Inventors: Paul C Coffin, Ft. Collins, CO (US); Richard Lynn Gardner, Jr., Greeley, CO (US); Michael J. Chaloner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 09/791,107

(22) Filed: Feb. 22, 2001

(65) Prior Publication Data
US 2002/0114103 A1 Aug. 22, 2002

(51) Int. Cl.$^7$ .............................................. G11B 15/68
(52) U.S. Cl. ...................... 360/92; 369/30.41
(58) Field of Search .......................... 369/30.01, 30.06, 369/30.38–30.42, 178.01, 191; 360/92

(56) References Cited

U.S. PATENT DOCUMENTS

| 3,730,535 A | 5/1973 | Huber ....................... 274/4 B |
| 3,735,989 A | 5/1973 | Dattilo ...................... 274/4 B |
| 4,985,790 A | 1/1991 | Komatsu et al. ........... 360/96.5 |
| 5,016,127 A | * 5/1991 | Inoue ......................... 360/92 |
| 5,021,902 A | 6/1991 | Ishikawa et al. ............... 360/92 |
| 5,596,556 A | 1/1997 | Luffel et al. ................... 369/36 |
| 5,652,682 A | 7/1997 | Elliott |
| 5,739,978 A | 4/1998 | Ellis et al. |
| 6,025,972 A | 2/2000 | Schmidtke et al. ........ 360/98.06 |
| 6,160,786 A | 12/2000 | Coffin et al. ................. 369/178 |

FOREIGN PATENT DOCUMENTS

| EP | 0288165 A2 | 10/1988 | |
| EP | 0566351 A2 | 10/1993 | |
| EP | 00884725 A2 | 6/1998 | ........... G11B/15/67 |
| GB | 1310601 | 3/1969 | ........... G11B/15/00 |
| GB | 1506778 | 7/1974 | |
| GB | 2352865 A | 2/2001 | |
| JP | 6-150492 | * 5/1994 | .................. 369/92 |
| JP | 10-11867 | 1/1998 | |
| JP | 63-61482 | 3/1998 | |

* cited by examiner

Primary Examiner—A. J. Heinz

(57) ABSTRACT

An apparatus and method for retaining at least two different sizes of data cartridges in a storage magazine. A frame assembly defines a chamber in the storage magazine. The chamber is dimensioned to receive the largest of the two different sizes of data cartridges therein. A cartridge referencing member is mounted to the frame assembly and is resiliently displaceable within the chamber. The cartridge referencing member applies a biasing force to a data cartridge received therein to retain the received data cartridge in a registration position within the chamber to keep it from floating into an unknown position within the interior of the chamber.

20 Claims, 4 Drawing Sheets

APPARATUS AND METHOD FOR RETAINING DIFFERENT SIZES OF DATA CARTRIDGES IN A STORAGE MAGAZINE

FIELD OF THE INVENTION

The invention generally pertains to media storage systems for handling and storing data cartridges, and more specifically, to an apparatus and method for retaining at least two different sizes of data cartridges in a storage magazine of the media storage system.

BACKGROUND OF THE INVENTION

Autochangers or media storage systems are commonly used to store data cartridges and to retrieve desired data cartridges so that computer readable data may be written to and/or read from the data cartridges. As such, large volumes of computer readable data can be stored on numerous data cartridges and accessed by a single computer or by multiple computers connected to the media storage system over a network. Such media storage systems are often referred to as "juke box" storage systems, and may include a storage magazine and a cartridge read/write device. The storage magazine serves as a storage location for the data cartridges. Multiple storage magazines are commonly arranged so that they form one or more vertical stacks. The media storage system also includes a cartridge engaging assembly or "picker" for moving among and accessing the data cartridges stored therein. For example, when a new data cartridge is added to the media storage system (i.e., at a mail slot), the cartridge engaging assembly delivers the data cartridge to a storage magazine in the media storage system. Or for example, when a data cartridge is accessed for use (e.g., to read and/or write data thereto), the cartridge engaging assembly delivers the data cartridge to the read/write device, and may also return the data cartridge to the storage magazine after it has been accessed.

Media storage systems are typically designed for use with data cartridges of a particular type (i.e., configuration or size). For example, one type of data cartridge is the so-called digital linear tape (DLT) data cartridge. Another type of data cartridge is the linear tape open (LTO) data cartridge. The LTO data cartridge is approximately three millimeters narrower than the DLT data cartridge. Accordingly, a media storage system designed for use with an LTO data cartridge typically cannot accommodate the wider DLT data cartridges. Of course, this situation is disadvantageous in that it limits the media storage system to use with a single type of data cartridge.

Partly in an effort to address the foregoing problem of media compatibility, media storage systems have been developed that utilize removable cartridge storage magazines. Thus, one type of storage magazine may be configured to receive the DLT type of data cartridges while another type of storage magazine may be configured to receive another data cartridge type (e.g., an LTO data cartridge). The media storage system can then be reconfigured to receive a different data cartridge type by replacing the storage magazines with the appropriate type.

While the foregoing solution is effective from a functional standpoint, in that it allows the media storage system to be used with another data cartridge type, it suffers the disadvantage of requiring different types of storage magazines for each type of data cartridge.

In another effort to address the foregoing problem of media compatibility, the storage magazine itself may be retrofitted with insertable fins or rib members. Thus, the storage magazine configured to receive the larger DLT data cartridges can be resized using the insertable fins to accommodate the smaller LTO data cartridges. Again, while this solution is effective from a functional standpoint, it suffers the disadvantage of requiring additional parts (i.e., the insertable fins) that may be misplaced or lost. In addition, the storage magazine can only be used with the one size data cartridge at a time (i.e., that which the storage magazine is configured, or reconfigured, to receive).

SUMMARY OF THE INVENTION

Apparatus for retaining at least two different sizes of data cartridges in a storage magazine, may comprise a frame assembly defining a chamber in the storage magazine. The chamber is dimensioned to receive the largest of the different sizes of data cartridges therein. A cartridge referencing member mounted to the frame assembly is resiliently displaceable within the chamber. The cartridge referencing member applies a biasing force to a data cartridge received therein to retain the received data cartridge in a registration position within the chamber.

Also disclosed is a method for retaining data cartridges in a storage magazine, that may comprise the following steps: inserting one of at least two different sizes of data cartridges into a chamber formed in the storage magazine; and applying a biasing force to the inserted data cartridge, thereby retaining the inserted data cartridge in a registration position in the chamber of the storage magazine.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 1:
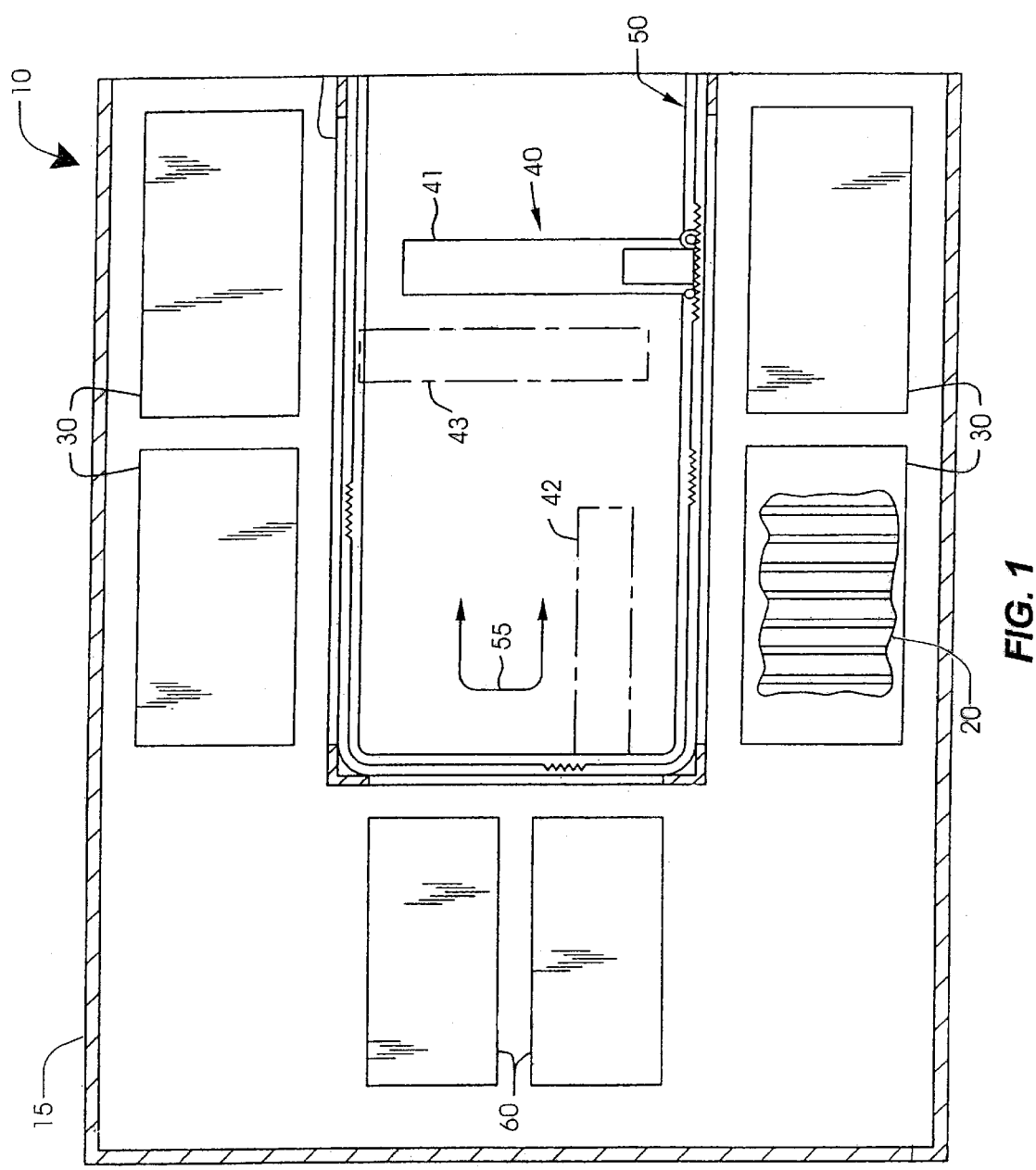
FIG. 1 is a plan view of a media storage system that utilizes the apparatus and method for retaining at least two different sizes of data cartridges in a storage magazine thereof.

Apparatus 10 for retaining at least two different sizes of data cartridges 20 in a storage magazine 30, is shown and described herein as it could be used with a media storage system 15. Briefly, media storage systems 15 are used to store large volumes of computer readable data. The computer readable data is typically stored on multiple data cartridges 20 that are arranged in the media storage system 15 in cartridge receiving devices (e.g., storage magazines 30, read/write device 60, a mail slot (not shown), etc.). The data cartridges 20 are available in various sizes. For example, both LTO and DLT data cartridges 20 are commonly used with the media storage system 15, wherein a DLT data cartridge 21 has a width approximately three millimeters greater than that of an LTO data cartridge 22. It is therefore desirable to store different sizes of data cartridges 20 in the same storage magazine 30. The invention relates to a method and apparatus for retaining at least two different sizes of data cartridges 20 in the storage magazine 30.

According to the teachings of the invention, the media storage system 15 may include a cartridge engaging assembly 40. The cartridge engaging assembly 40 can be moved (e.g., in the direction of arrow 55) among the storage magazines 30 and positioned adjacent thereto for accessing and storing the data cartridges 20 therein. The storage magazine 30 may comprise a frame assembly 70 defining a chamber 80 therein. That is, the chamber 80 is formed by two opposing partitions or side walls 71 and 72, and may also include a top wall 73, a bottom wall 74, and a rear wall 75. According to the invention, the chamber 80 is dimensioned to receive at least two different sizes of data cartridges 20 therein (e.g., LTO and DLT). Preferably, the chamber 80 is dimensioned to receive the largest size data cartridge 20 (e.g., DLT) for use with the media storage system 15. As such, the larger size data cartridge 20 (e.g., DLT) and each smaller size data cartridge 20 (e.g., LTO) can be retained in the storage magazine 30, as described in more detail below. A cartridge referencing member 90 is mounted or affixed to the frame assembly 70 (e.g., to side wall 72). As one of the different sizes of data cartridges 20 is inserted and received within the chamber 80, the cartridge referencing member 90 is resiliently displaced therein to accommodate the width of the data cartridge 80, and urges the data cartridge 20 toward, and retains the data cartridge 20 in, a registration position. Also preferably, the cartridge referencing member 90 comprises an elongated arm 100 (e.g., a leaf spring) mounted at one end to the frame assembly 70 and having a cartridge biasing end opposite thereof. Preferably the cartridge referencing member 90 includes a buffer member on the tip portion 105 that is resiliently displaceable therewith. In one embodiment, the tip portion 105 may be provided with a member 107 for slidingly engaging the data cartridge 20. In another embodiment, the tip portion 105 may comprise a roller 110 for rollingly engaging the data cartridge 20. In either embodiment, the data cartridge 20 contacts the tip portion 105 of the elongated arm 100 and is guided into the chamber 80 between the cartridge referencing member 90 and the opposing side wall 71 into a registration position therein. That is, as the data cartridge 20 is received in the chamber 80, the cartridge referencing member 90 applies a biasing force to the data cartridge 20 to urge and hold the data cartridge 20 in a known registration position. As such, the biasing force keeps the data cartridge 20 from floating into an unknown position within the wider interior of the chamber 80, where it could otherwise bind during insertion or removal, or fail to be picked by the cartridge engaging assembly 40. Preferably, the cartridge referencing member 90 biases the data cartridge 20 against a reference surface of the chamber 80 (e.g., side wall 71, a fin member (not shown), etc.) so that the data cartridge 20 can be reliably engaged by the cartridge engaging assembly 40. Thus according to the invention, different sizes of data cartridges 20 are properly aligned and retained in the chamber 80.

In use, a system operator or the cartridge engaging assembly 40 may insert one of the different sizes of data cartridges 20 into the chamber 80 formed in the storage magazine 30. Preferably, the cartridge referencing member 90 is resiliently displaced within the chamber 80 as the data cartridge 20 is received therein. As the data cartridge 20 is received in the chamber 80, the cartridge referencing member 90 engages the inserted data cartridge 20, and applies a biasing force to the data cartridge 20. As such, the inserted data cartridge 20 is retained in the chamber 80 of the storage magazine 30 so that the data cartridge 20 does not float into an unknown position within the wider interior of the chamber 80 (i.e., it is urged and held in a known registration position).

It is also important to recognize that according to the teachings of the invention, the storage magazines 30 may be uniformly molded to retain at least two different sizes of data cartridges 20. In addition, the chambers 80 need not be formed to a precise tolerance. That is, the size of the chambers 80 can vary to some extent from one to another and such variation is accommodated for by the cartridge referencing member 90. As such, the invention reduces the cost of manufacture of the storage magazines 30. In addition, neither the media storage system nor the storage magazines 30 need to be retrofitted when different size data cartridges 20 are used therewith. Thus, the invention saves time and reduces the cost of operation of the media storage system 15.

Having generally described an apparatus and method for retaining at least two different sizes of data cartridges 20 in a storage magazine 30, and several advantages thereof, the apparatus and method will now be described in further detail.

The apparatus 10 for retaining at least two different sizes of data cartridges 20 in a storage magazine 30 may comprise a media storage system 15 such as that shown in FIG. 1. The media storage system 15 includes data cartridges 20 stored in one or more storage magazines 30. In use, a control system (not shown) moves a cartridge engaging assembly 40 along a positioning rail 50 (in the directions of arrow 55) adjacent the data cartridges 20. For purposes of illustration, the cartridge engaging assembly 40 is shown in positions 41, 42, and 43 in FIG. 1. The cartridge engaging assembly 40 is shown adjacent the data cartridge 20 contained in the storage magazine 30 at positions 41 and 43, and is shown adjacent the read/write device 60 at position 42. The cartridge engaging assembly 40 transports the data cartridge 20 about the media storage system 15, for example, between the read/write device 60 and the storage magazine 30. According to the invention, at least two different sizes of data cartridges 20 may be stored in the storage magazine 30 without having to retrofit either the media storage system 15 or the storage magazines 30.

In use, a data cartridge 20 to be stored in the media storage system 15 may be inserted in a mail slot (not shown). For example, a new data cartridge 20 may be added to the media storage system 15 or a data cartridge 20 that has been removed may be returned to the storage magazine 30. In response, the control system moves the cartridge engaging assembly 40 along the positioning rail 50 adjacent the data cartridges 20. Where a data cartridge 20 has been added to the media storage system 15, the cartridge engaging assembly 40 retrieves the data cartridge 20 from the mail slot and delivers the data cartridge 20 to an available storage magazine 30. Similarly, the cartridge engaging assembly 40 may return the data cartridge 20 from the read/write device 60 to the storage magazine 30. For example, the cartridge engaging assembly 40 may transport the data cartridge 20 to the next available chamber 80 (see FIG. 2) in one of the storage magazines 30. Or for example, the cartridge engaging assembly 40 may transport the data cartridge 20 to a specific chamber 80 in one of the storage magazines 30 (e.g., based on originating department, inventory schedule, data classification, etc.). According to the invention, at least two different sizes of data cartridges 20 can be delivered to any available chamber 80 in the storage magazine 30, for reasons explained in more detail below.

Figure 2:
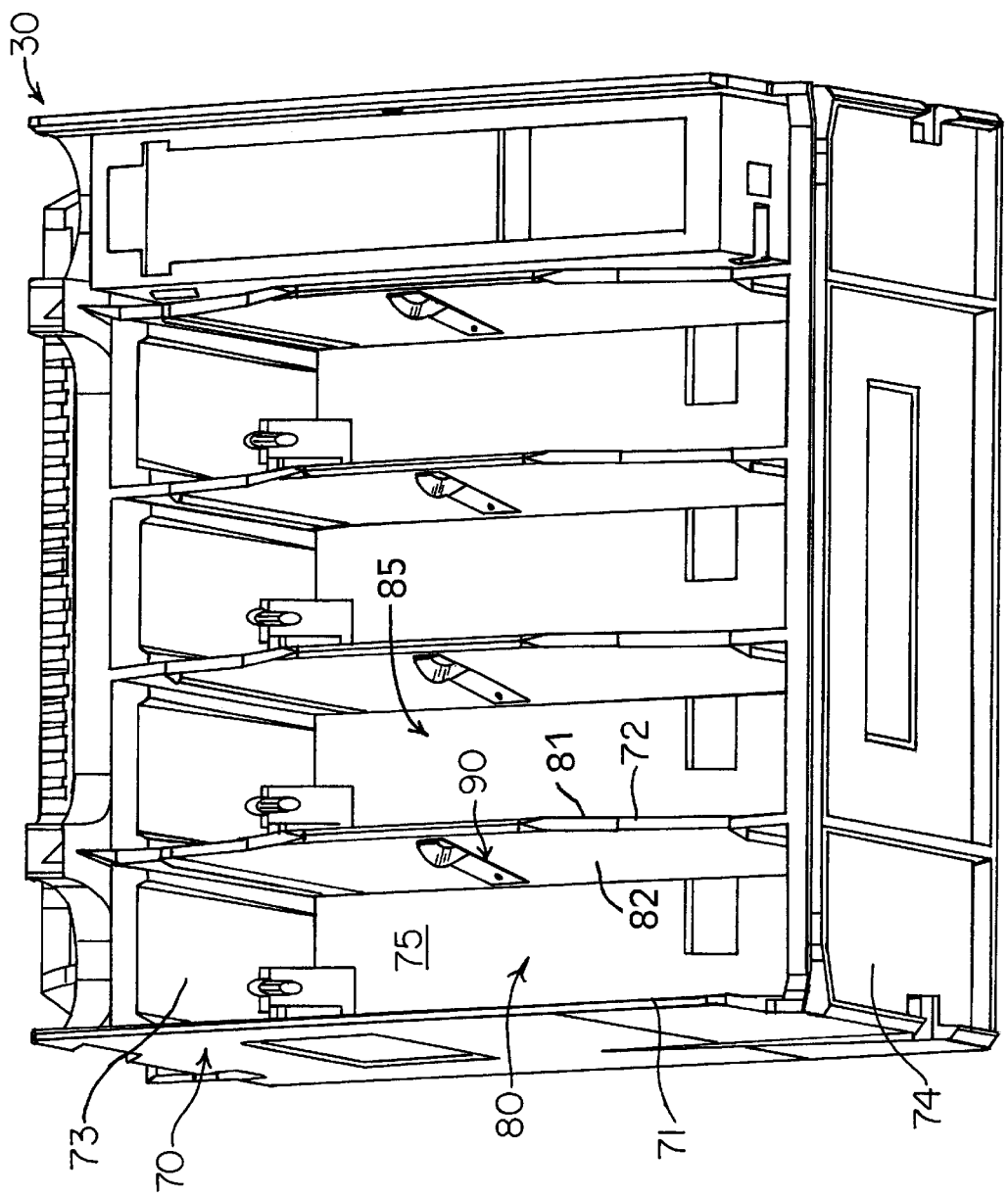
FIG. 2 is a perspective view of an exemplary storage magazine for use with the media storage system, showing a cartridge referencing member mounted within each chamber.

The storage magazine 30 shown in FIG. 2 may comprise a frame assembly 70 that defines a cavity or chamber 80 sized to receive the data cartridge 20 therein. That is, the frame assembly 70 includes opposing partitions or side walls 71, 72, and may also include a top wall 73, a bottom wall 74, and a rear wall 75, that define one or more chambers 80 in the storage magazine 30. Preferably, the chamber 80 is over-sized. That is, the chamber 80 is formed to receive the largest data cartridge 20 (e.g., DLT) therein. As such, each smaller size data cartridge 20 (e.g., LTO) can also be received therein. A cartridge referencing member 90 is mounted to the frame assembly 70 (e.g., on side wall 72). The cartridge referencing member 90 is resiliently displaceable within the chamber 80 as the data cartridge 20 is received therein. Thus, as the data cartridge 20 is received in the chamber 80, the cartridge referencing member 90 flexes to allow the data cartridge 20 to be received therein. In addition, the cartridge referencing member 90 applies a biasing force to the data cartridge 20 to align the data cartridge in the chamber 80 and to keep the narrower data cartridge 20 from floating into an unknown position within the wider interior of the chamber 80 (i.e., it is retained in a known registration position therein). The cartridge referencing member 90 may bias the data cartridge 20 against a reference surface of the chamber 80 (e.g., side wall 71). Thus, the data cartridge 20 is aligned against the reference surface so that different sizes of data cartridges 20 may be reliably engaged by the cartridge engaging assembly 40.

It is understood that the storage magazine 30 may take any suitable form. For example, the storage magazine 30 need not be removable and may instead be integrally formed or permanently mounted therein, a series of partitions within the media storage system 15, etc. In addition, any number of chambers 80 can be formed therein. Also for example, the side walls 71, 72, and indeed walls 73, 74 and 75 need not be solid partitions, any particular thickness or dimension, etc.

It is also understood that the cartridge referencing member 90 may be mounted in any suitable position within the chamber 80. Preferably, the cartridge referencing member 90 is mounted on the side wall 72 near the back wall 75 and the cartridge biasing end thus applies a biasing force to the front portion of the data cartridge 20 (i.e., near the opening of the chamber 80), as shown in FIG. 2. However, the cartridge referencing member 90 may be mounted, for example, to the side wall 72 near the opening of the chamber 80 and the cartridge biasing end thus applies the biasing force against the rear portion of the data cartridge 20 (i.e., near the back wall 75). In another embodiment, the cartridge referencing member 90 may also be, or may be instead, mounted to the top wall 73 and/or to the bottom wall 74 to accommodate data cartridges 20 of various heights. In yet another embodiment, a cartridge referencing member 90 may be mounted to the back wall 75 to accommodate data cartridges 20 of various depths. In addition, it is further understood that more than one cartridge referencing member 90 may be mounted to more than one of the walls 71–75 that form the chamber 80. For example, a cartridge referencing member 90 may be mounted to both side walls 71 and 72, to a side wall 72 and the top wall 73, etc.

The cartridge referencing member 90 is preferably mounted within the chamber 80 within a slot formed in the side wall 72, as shown in FIG. 2. As such, additional fasteners are not required to affix the cartridge referencing member 90 to the chamber 80. In addition, the cartridge referencing member 90 is preferably exposed for several inches along the side wall 72 within the chamber 80 and is flexible along the length thereof. A longer exposed span, as such, reduces the force applied to the data cartridge 20 so that it may be more readily picked by the cartridge engaging assembly 40. Preferably, the cartridge referencing member 90 only applies sufficient force to retain the data cartridge 20 in the chamber 80 when the storage magazine 30 is being transported external to the media storage system 15, and does not unduly burden the cartridge engaging assembly 40 during the insertion and/or removal of data cartridges 20.

It is understood that the cartridge referencing member 90 may be mounted in any suitable manner within the chamber 80. For example, in another embodiment, the cartridge referencing member 90 may be mounted in one chamber 85 with the tip portion 105 extending through the side wall 72 and into another chamber 80. For example, one end or mounting portion 102 of the elongated arm 100 may be mounted to one side 81 of the side wall 72 in one chamber 85 and extend substantially along the one side 81. An opening (not shown) may be formed in the side wall 72 between the first side 81 and a second side 82 to receive the tip portion 105 therethrough. As such, the tip portion 105 extends through the side wall 72 to engage a data cartridge 20 that is inserted into the chamber 80. The opening formed in the side wall 72 may also be elongated so that a portion of the elongated arm 100 also extends therethrough and into the chamber 80.

Figure 3:
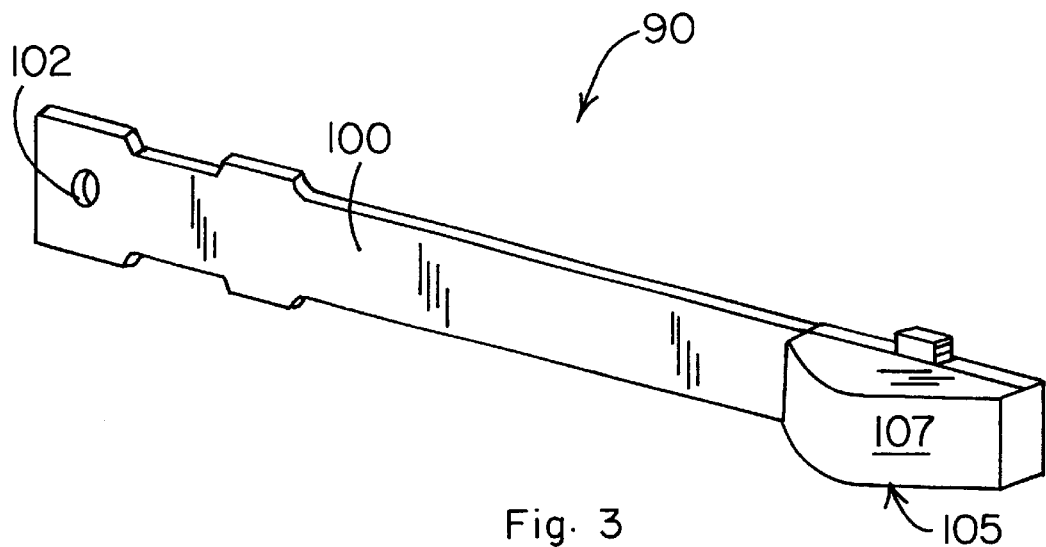
FIG. 3 is a perspective view of an exemplary cartridge referencing member.
Figure 4:
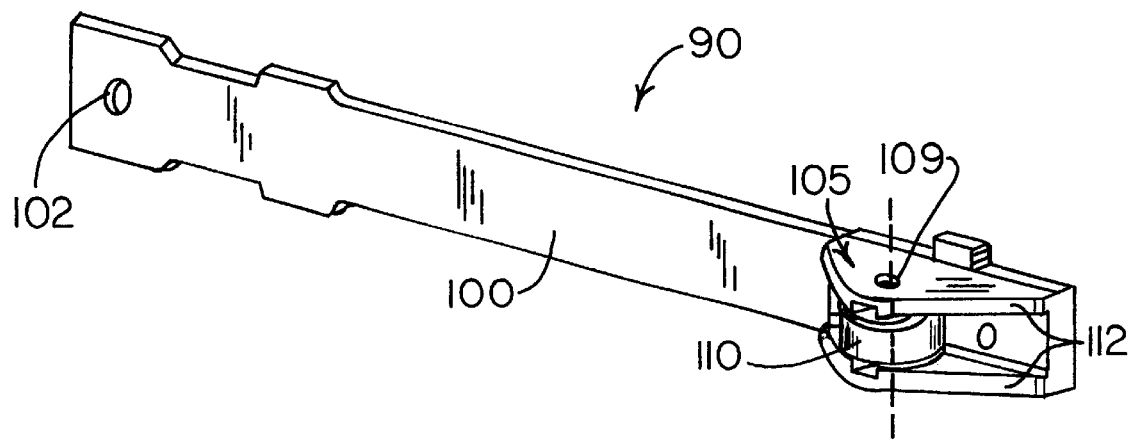
FIG. 4 is a perspective view of another exemplary cartridge referencing member.

It is also understood that the cartridge referencing member 90 may be mounted to the frame assembly 70 of the storage magazine 30 using any suitable means. For example, a mounting post (not shown) may be molded as part of the side wall 72 so that the elongated arm 100 may be fitted thereon at one end 102 (FIG. 3 and FIG. 4). A clip can also be slipped over the mounting post to further secure the elongated arm 100 thereto. The cartridge referencing member 90 may also be mounted using other suitable means such as a rivet, screw, glue, etc. Indeed the elongated arm 100 may even be molded as part of the chamber 80 (e.g., the side wall 72).

An exemplary embodiment of the cartridge referencing member 90 is shown in more detail in FIG. 3. The cartridge referencing member 90 may comprise an elongated arm 100 with a tip portion 105 mounted to the cartridge biasing end thereof. The elongated arm 100 may be, for example, a leaf spring attached at one end 102 to the side wall 72 (see FIG. 2). The tip portion 105 may be, for example, a ridge member 107 that slidingly engages the data cartridge 20 as it is inserted into the chamber 80 to guide the data cartridge 20 therein.

It is understood that although the elongated arm 100 is preferably stainless steel, the elongated arm 100 can be constructed of any resilient material (e.g., plastic). In addition, although the elongated arm 100 is preferably four inches long, it may be any suitable length. The design of the elongated arm 100 will depend on design considerations, such as, but not limited to, the desired resiliency, elasticity, and durability thereof.

Another exemplary embodiment of the cartridge referencing member 90 is shown in FIG. 4, again comprising an elongated arm 100 mounted at one end 102 to the side wall 72 of the chamber 80, and a tip portion 105 mounted to the cartridge biasing end thereof. In the embodiment shown in FIG. 4, the tip portion 105 may be provided with a roller 110 rotatably mounted about an axis 109 between opposing support arms 112 thereof. As such, the tip portion 105 may rollingly engage the data cartridge 20 with the roller 110 as the data cartridge 20 is received within the chamber 80.

It is understood that the roller 110 may be manufactured of any suitable material, such as, but not limited to metal or plastic. In addition, the roller 110 may be cylindrical or spherical (e.g., a ball bearing). Similarly, the roller 110 need not be supported between opposing support arms 112. For example, the roller 112 may be attached to a single support arm 112. Or for example, where the roller 110 is spherical, the roller may be held in support similar to the ball point in a pen. It is also understood that a plurality of rollers 110 may be positioned adjacent one another, side-by-side, or along the length of the elongated arm 100.

It is understood that the tip portion 105 may be any suitable shape and may be manufactured of any suitable material and is optionally provided with member 107, 110. In addition, where provided, the member 107, 110 may be integrally formed as part of cartridge referencing member 90, or separately formed and mounted thereto. Preferably, the member 107, 110 is a buffer member (e.g., a plastic tab, a foam cushion, a rubber coating, a roller, etc.). The buffer member contacts and engages the data cartridge 20 so that the data cartridge 20 does not directly contact the elongated arm 100. As such, the buffer member provides protection against damage and wear to the data cartridge 20 as it is inserted and removed from the chamber 80. However in other embodiments, the member 107, 110 need not serve as a buffer and may instead serve as a guide, etc.

It is further understood that the embodiments of the cartridge referencing member 90 shown in FIG. 3 and FIG. 4 are merely illustrative of the invention. Other embodiments are also contemplated as being within the scope of the invention. Other embodiments may include, for example, a cartridge referencing member that is mounted in the center of the elongated arm 100 with a cartridge biasing end on each side thereof, etc.

Figure 5:
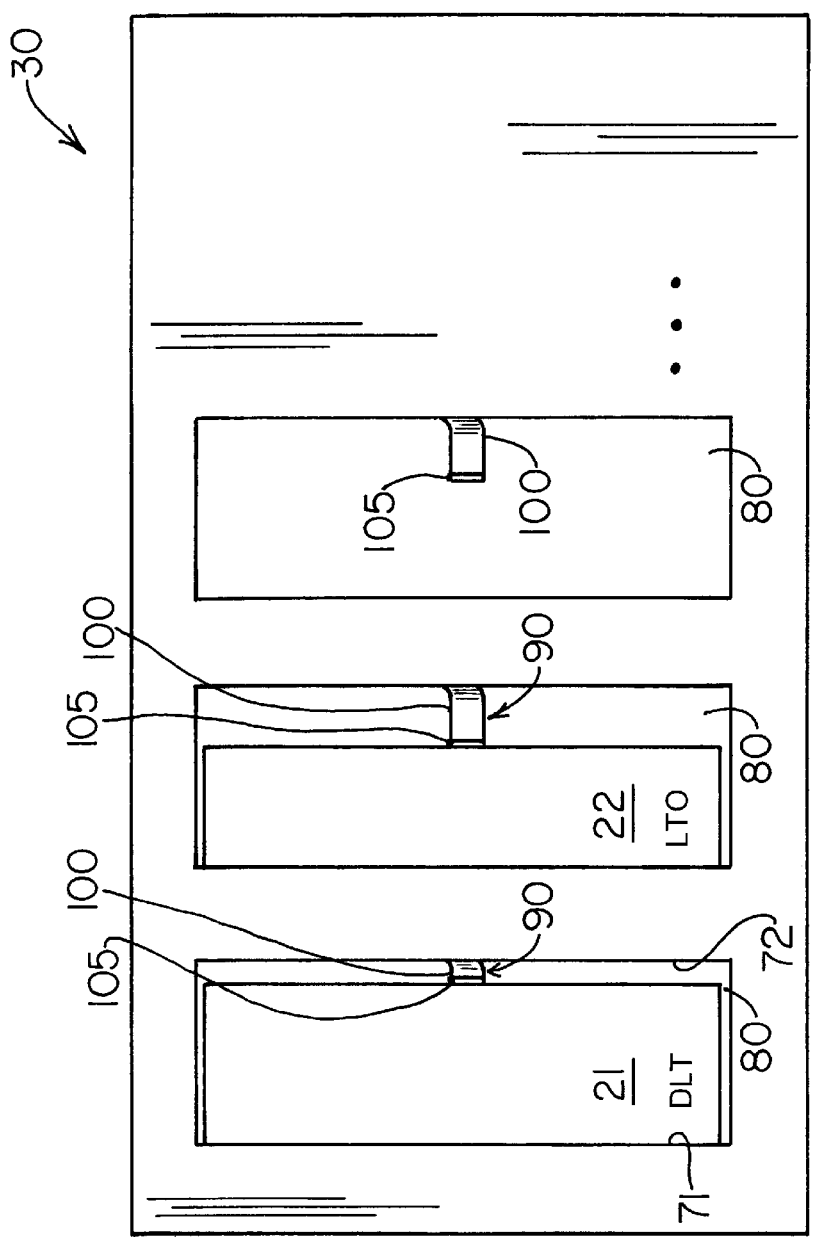
FIG. 5 is a simplified, front plan view of the storage magazine showing different sizes of data cartridges stored therein.

FIG. 5 is a simplified front plan view of the storage magazine 30 showing both a DLT data cartridge 21 and an LTO data cartridge 22 stored therein. The DLT data cartridge 21 is transported by the cartridge engaging assembly 40 adjacent an available chamber 80 in the storage magazine 30. The cartridge engaging assembly 40 then inserts the DLT data cartridge 21 into the chamber 80. As the DLT data cartridge 21 is received in the chamber 80, the DLT data cartridge 21 contacts the tip portion 105 of the cartridge referencing member 90. For example, the DLT data cartridge 21 may contact the ridge member 107 or the roller 110 on the tip portion 105 (FIG. 3 and FIG. 4, respectively). In any event, the DLT data cartridge 21 is engaged by the cartridge referencing member 90, which resiliently deflects to allow the DLT data cartridge 21 to be received in the chamber 80 of the storage magazine 30. As the DLT data cartridge 21 is received in the chamber 80, the cartridge referencing member 90 (i.e., the cartridge biasing end thereof) applies a biasing force against the DLT data cartridge 21 to bias it in a registration position (e.g., against the opposing side wall 71) to keep the data cartridge 20 from floating into an unknown position within the interior of the chamber 80. As such, the DLT data cartridge 21 is retained in the chamber 80 (e.g., against the reference surface 71) of the storage magazine 30. Once inserted into the chamber 80, the cartridge engaging assembly 40 disengages from the DLT data cartridge 21 and is removed therefrom. The LTO data cartridge 22 can be similarly inserted into an available chamber 80 in the storage magazine 30 and aligned and retained therein via the biasing force applied thereto by the cartridge referencing member 90. Thus, various size data cartridges (e.g., DLT data cartridge 21 and LTO data cartridge 22) are aligned and retained within the same storage magazine 30 and can be reliably removed by the cartridge engaging assembly 40.

It should be noted that although the apparatus and method of the present invention is illustrated using a particular media storage system 15, the teachings of the invention may be utilized in any of a wide range of media storage systems now known in the art or that may be developed in the future for storing one or more data cartridges 20. Accordingly, the present invention should not be regarded as limited to the particular media storage system 15 shown and described herein. It should also be noted that while the invention is shown and described herein as it could be used to store and retrieve LTO and DLT data cartridges 20 having standard sizes and configurations, it is not limited to any particular type or style of data cartridge. Consequently, the present invention should not be regarded as limited to use with the media storage system 15 for the LTO and DLT data cartridges 20 shown and described herein.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for retaining data cartridges in a storage magazine, comprising:
    a frame assembly defining a chamber in the storage magazine, said chamber dimensioned to receive the largest of at least two different sizes of data cartridges therein;
    a cartridge referencing member mounted to said frame assembly, said cartridge referencing member resiliently displaceable within the chamber, said cartridge referencing member applying a biasing force to a data cartridge received therein to retain said received data cartridge in a registration position within said chamber, wherein at least two different sizes of data cartridges are biased by said referencing member when individually received in said chamber.

2. The apparatus of claim 1, wherein at least one of the at least two different sizes of data cartridges is a linear tape open (LTO) data cartridge.

3. The apparatus of claim 1, wherein at least one of the at least two different sizes of data cartridges is a digital linear tape (DLT) data cartridge.

4. The apparatus of claim 1, wherein said cartridge referencing member comprises an elongated arm mounted to said frame assembly.

5. The apparatus of claim 1, wherein said cartridge referencing member comprises an elongated arm having a mounting portion and a tip portion, the mounting portion of said elongated arm being mounted to said frame assembly and the tip portion contacting said received data cartridge.

6. The apparatus of claim 5, further comprises a buffer member mounted to the tip portion of said elongated arm so that said buffer member contacts said received data cartridge.

7. The apparatus of claim 5, further comprising a ridge member mounted to the tip portion of said elongated arm so that said ridge member contacts said received data cartridge.

8. The apparatus of claim 5, further comprising a roller mounted to the tip portion of said elongated arm so that said roller contacts said received data cartridge.

9. The apparatus of claim 1, wherein said received data cartridge is biased against a reference surface.

10. The apparatus of claim 9, wherein said reference surface is an opposing side wall.

11. The apparatus of claim 1, wherein the chamber is formed by two opposing side walls, wherein said cartridge referencing member is mounted to one of the two opposing side walls, and said received data cartridge is biased against the other of said two opposing side walls by said cartridge referencing member.

12. A method for retaining data cartridges in a storage magazine, comprising:

inserting one of at least two different sizes of data cartridges into a chamber formed in said storage magazine; and applying a biasing force to said inserted data cartridge, thereby retaining said inserted data cartridge in a registration position in the chamber of the storage magazine, wherein at least two different sizes of data cartridges are biased by said biasing force when individually received in said chamber.

13. The method of claim 12, wherein applying said biasing force retains said inserted data cartridge against an opposing side wall of the chamber.

14. The method of claim 12, further comprising resiliently displacing a cartridge referencing member within the chamber as said one of the at least two different sizes of data cartridges is inserted therein, said biasing force applied to said inserted data cartridge within said chamber by said cartridge referencing member.

15. The method of claim 12, further comprising engaging said one of the at least two different sizes of data cartridges with a buffer member.

16. The method of claim 12, further comprising rollingly engaging said one of the at least two different sizes of data cartridges.

17. The method of claim 12, further comprising slidingly engaging said one of the at least two different sizes of data cartridges.

18. An apparatus for retaining data cartridges in a storage magazine, comprising:

means for receiving the largest of at least two different sizes of data cartridges in the storage magazine;

means for engaging at least one of said two different sizes of data cartridges; and means for applying a biasing force to said engaged data cartridge, thereby retaining said engaged data cartridge in said storage magazine, wherein at least two different sizes of data cartridges are biased by said biasing force when individually received in said storage magazine.

19. The apparatus of claim 18, wherein said means for engaging is resiliently displaceable as said one of the at least two different sizes of data cartridges is received in the storage magazine.

20. The apparatus of claim 18, further comprising means for referencing said engaged data cartridge within the storage magazine in a registration position therein.

* * * * *